US011461999B2

(12) United States Patent
Li et al.

(10) Patent No.: US 11,461,999 B2
(45) Date of Patent: Oct. 4, 2022

(54) IMAGE OBJECT DETECTION METHOD, DEVICE, ELECTRONIC DEVICE AND COMPUTER READABLE MEDIUM

(71) Applicant: Beihang University, Beijing (CN)

(72) Inventors: Jia Li, Beijing (CN); Kui Fu, Beijing (CN); Kai Mu, Beijing (CN); Qinping Zhao, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 17/061,400

(22) Filed: Oct. 1, 2020

(65) Prior Publication Data

US 2022/0027657 A1 Jan. 27, 2022

(30) Foreign Application Priority Data

Jul. 24, 2020 (CN) .......................... 202010723955.5

(51) Int. Cl.
  *G06V 10/48* (2022.01)
  *G06V 10/25* (2022.01)
  *G06V 10/426* (2022.01)

(52) U.S. Cl.
  CPC .............. *G06V 10/48* (2022.01); *G06V 10/25* (2022.01); *G06V 10/426* (2022.01); *G06K 2207/1012* (2013.01)

(58) Field of Classification Search
  None
  See application file for complete search history.

(56) References Cited

PUBLICATIONS

Liang, Zhijun, Juan Rojas, Junta Liu, and Yisheng Guan. "Visual-Semantic Graph Attention Networks for Human-Object Interaction Detection." arXiv preprint arXiv:2001.02302 (2020). (Year: 2020).*
Li, Qiaozhe, Xin Zhao, Ran He, and Kaiqi Huang. "Visual-semantic graph reasoning for pedestrian attribute recognition." In Proceedings of the AAAI conference on artificial intelligence, vol. 33, No. 01, pp. 8634-8641. 2019. (Year: 2019).*
Mi, Li, and Zhenzhong Chen. "Hierarchical Graph Attention Network for Visual Relationship Detection." Jun. 2020 (Year: 2020).*

* cited by examiner

*Primary Examiner* — David Perlman
(74) *Attorney, Agent, or Firm* — Dragon Sun Law Firm, PC; Jinggao Li, Esq.; Nathaniel Perkins (57) ABSTRACT

The embodiments of this disclosure disclose an image object detection method, device, electronic equipment, and computer-readable medium. A specific mode of carrying out the method includes: performing region segmentation on a target image to obtain at least one image region; performing feature extraction on each image region in the at least one image region to obtain at least one feature map; generating a semantic relation graph and a spatial distribution relation graph based on the at least one feature map and the at least one image region; generating an image region relation graph based on the semantic relation graph and spatial distribution relation graph; determining a target image region from the at least one image region based on the image region relation graph; displaying the target image region. This implementation mode achieves an improvement of user experience and a growth of network traffic.

6 Claims, 3 Drawing Sheets

IMAGE OBJECT DETECTION METHOD, DEVICE, ELECTRONIC DEVICE AND COMPUTER READABLE MEDIUM

CROSS-REFERENCE TO RELATED APPLICATION

This application claims priorities from CN Application No. CN 202010723955.5, filed Jul. 24, 2020, the contents of which are incorporated herein in the entirety by reference.

TECHNICAL FIELD

The embodiments of this disclosure relate to the field of computer technology, and in particular, to an image object detection method, device, electronic equipment, and computer-readable medium.

BACKGROUND ART

With the advent of the Internet era, image display technology is changing with each passing day, but object detection in image display is fairly difficult to achieve, which means that we have to not only judge the category of the item in the picture, but also mark its location therein. This is the problem of object detection in image display.

Related image object detection methods are usually cumbersome or rather low in accuracy, and can hardly attract users to click.

SUMMARY

The content of this disclosure is to introduce concepts in a brief way, and these concepts will be described in detail in the following Detailed Description portion. The content of this disclosure is not intended to identify the key features or essential features of the claimed technical solution, nor is it intended to limit the scope of the claimed technical solution.

Some embodiments of this disclosure propose a method, device, electronic equipment and computer-readable medium for image object detection to solve the above technical problem mentioned in the Background Art portion.

In the first aspect, some embodiments of this disclosure provide a method for image object detection, the method including: performing region segmentation on a target image to obtain at least one image region; performing feature extraction on each image region in the at least one image region to obtain at least one feature map; generating a semantic relation graph and a spatial distribution relation graph based on the at least one feature map and the at least one image region; generating an image region relation graph based on the semantic relation graph and spatial distribution relation graph; determining a target image region from the at least one image region based on the image region relation graph; and displaying the target image region.

In the second aspect, some embodiments of this disclosure provide an device for image object detection, the device comprising: a segmenting unit configured to perform region segmentation on a target image to obtain at least one image region; an extracting unit configured to perform feature extraction on each image region in the at least one image region to obtain at least one feature map; a first generating unit configured to generate a semantic relation graph and a spatial distribution relation graph based on the at least one feature map and the at least one image region; a second generating unit configured to generate an image region relation graph based on the semantic relation graph and spatial distribution relation graph; a determining unit configured to determine a target image region from the at least one image region based on the image region relation graph; and a displaying unit configured to display the target image region.

In the third aspect, an embodiment of the present application provides a type of electronic equipment, the electronic equipment includes: one or more processors; a storage device for storing one or more programs; when one or more programs are executed by one or more processors, the one or more processors implement the method as described in any of the implementation modes in the first aspect.

In the fourth aspect, an embodiment of the present application provides a computer-readable medium on which a computer program is stored, and when the computer program is executed by a processor, the method as described in any of the implementation modes in the first aspect is implemented.

One of the above embodiments of this disclosure has the following beneficial effects: perform region segmentation on a target image to perform feature extraction on each image region; then generate a semantic relation graph and a spatial distribution relation graph based on the extracted features; generate an image region relation graph based on the semantic relation graph and the spatial distribution relation graph, and determine a target image region from the image according to the image region relation graph; and finally, display the target image region, thereby simply and accurately determining the target image region in the image and display it, which is more attractive to users to click, thus achieving the improvement of user experience and the growth of network traffic.

DESCRIPTION OF FIGURES

The above and other features, advantages and aspects of the embodiments of this disclosure will become more apparent in conjunction with the drawings and with reference to the following detailed description. Throughout the drawings, the same or similar reference signs indicate the same or similar elements. It should be understood that the drawings are schematic, and elements and components are not necessarily drawn to scale.

DETAILED DESCRIPTION

Hereinafter, the embodiments of this disclosure will be described in more detail with reference to the accompanying drawings. Although some embodiments of this disclosure are shown in the drawings, it should be understood that this disclosure can be implemented in various forms and should not be construed as being limited to the embodiments set forth herein. On the contrary, these embodiments are provided for a more thorough and complete understanding of this disclosure. It should be understood that the drawings and embodiments of this disclosure are only used for exemplary purposes, and not used to limit the protection scope of this disclosure.

In addition, it should be noted that, for ease of description, only the parts related to the relevant invention are shown in the drawings. In the case of no confliction, the embodiments in this disclosure and the features in the embodiments can be combined with each other.

It should be noted that such concepts as "first" and "second" mentioned in this disclosure are used only to distinguish different devices, modules or units, not to limit the order of functions performed by these devices, modules or units, or their interdependence.

It should also be noted that such qualifiers as "one" and "more" mentioned in this disclosure are illustrative and not restrictive. Those skilled in the art should understand that unless the context clearly indicates otherwise, they should be understood as "one or more".

The names of messages or information exchanged between multiple devices in the embodiments of this disclosure are only used for illustrative purposes, not to limit the scope of these messages or information.

Hereinafter, this disclosure will be described in detail with reference to the drawings and in conjunction with the embodiments.

Figure 1:
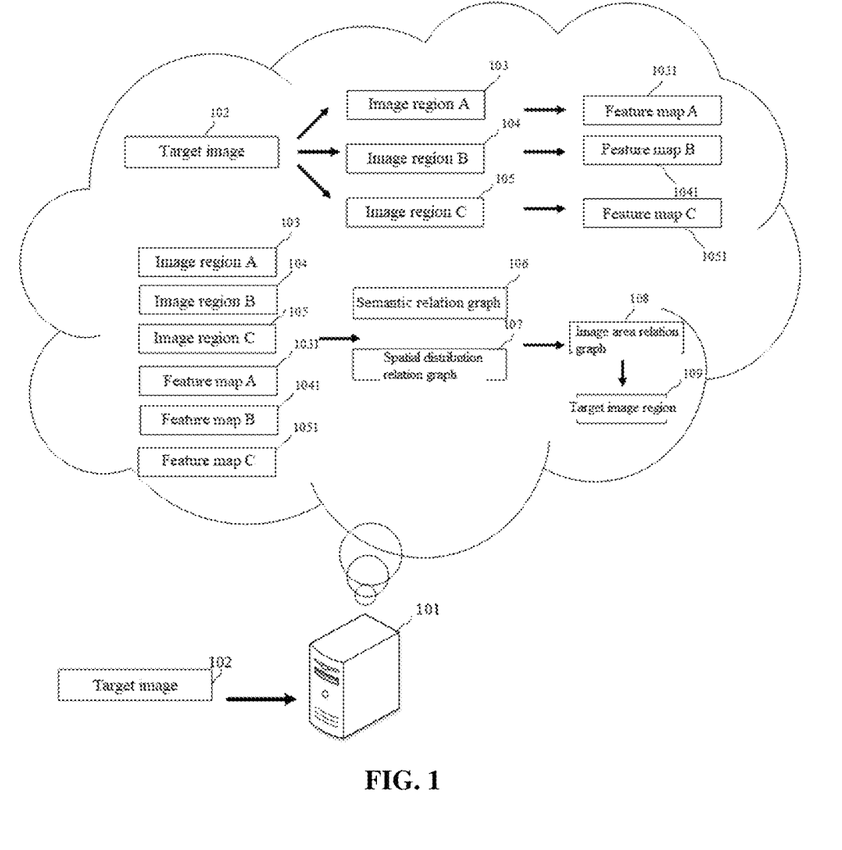
FIG. 1 is a schematic diagram of an application scenario of the image object detection method according to some embodiments of this disclosure.

FIG. 1 is a schematic diagram of an application scenario of the image object detection method according to some embodiments of this disclosure.

As shown in FIG. 1, a server 101 may perform region segmentation on an acquired target image 102 to obtain at least one image region: image region A103, image region B104, and image region C105. Here, the above-mentioned target image 102 may be obtained from the outside, or may be stored in advance. The above-mentioned region segmentation can be performed in multiple ways. As an example, region segmentation can be performed through a region proposal network. After that, the server 101 may perform feature extraction on the obtained image region to obtain corresponding feature map A1031, feature map B1041, and feature map C1051. Here, the above-mentioned feature extraction can be performed in multiple ways. As an example, feature extraction can be performed by the Histogram of Oriented Gradient (HOG) method.

Next, the server 101 may generate a semantic relation graph 106 and a spatial distribution relation graph 107 according to the at least one image region and the feature map corresponding to each region. Here, the semantic relation graph generally refers to a statistical diagram used to characterize the semantic relation of each image region. As an example, the above-mentioned semantic relation graph may be an undirected graph. The above-mentioned spatial distribution relation graph generally refers to a statistical diagram used to characterize the relations of the spatial distribution of each image region. As an example, the spatial distribution relation graph may be an undirected graph.

Then, an image region relation graph 108 is generated according to the semantic relation graph 106 and the spatial distribution relation graph 107. Here, the above-mentioned image region relation graph generally refers to a statistical diagram having the relations of each image region. As an example, the above-mentioned image region relation graph may be an undirected graph. The server 101 can generate the image region relation graph 108 in various ways. As an example, the above-mentioned server 101 may combine the above-mentioned semantic relation graph 106 and the spatial distribution relation graph to obtain the image region relation graph 108. Further, based on the image region relation graph 108, a target image region 109 is determined from the above-mentioned at least one image region. As an example, the server 101 may select from the image region relation graph, the image region with the most edges connected to the remaining image regions, as the target image region.

Finally, the server 101 may display the above-mentioned target image region 109.

It is understandable that the image object detection method may be executed by a terminal device, or may also be executed by the server 101. The execution entity of the above method may also include devices formed by integrating the above terminal device and the above server 101 through a network, or be executed by various software programs. Wherein, the terminal device may be various electronic equipment with information processing capabilities, including but not limited to smart phones, tablet computers, e-book readers, laptop portable computers, desktop computers, and so on. The execution entity may also be embodied as the server 101, software, and so on. When the execution entity is software, it can be installed in the electronic equipment listed above. It can be implemented as multiple software or software modules for providing distributed services e.g., or as single software or software module. No specific restrictions are made here.

It should be understood that the number of servers in FIG. 1 is only schematic. According to implementation requirements, there can be any number of servers.

Figure 2:
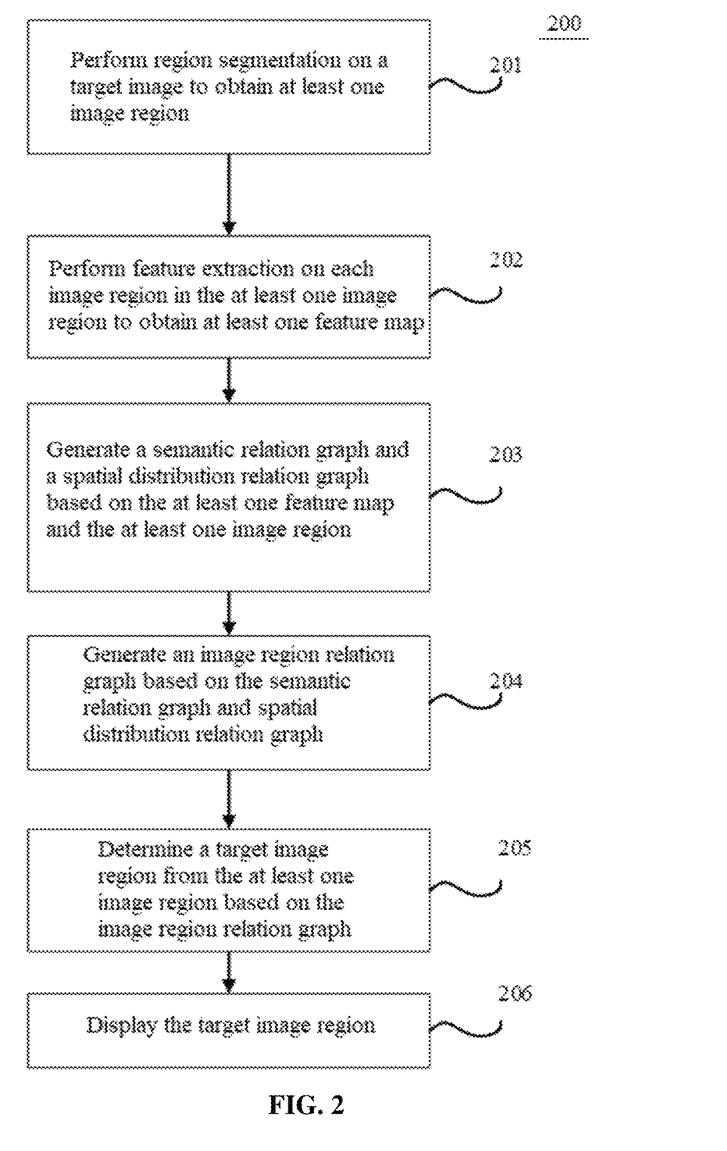
FIG. 2 is a flowchart of some embodiments of the image object detection method according to this disclosure.

With continued reference to FIG. 2, a flow process 200 of some embodiments of the image object detection method according to this disclosure is shown. The image object detection method includes the following steps:

Step 201: Perform region segmentation on a target image to obtain at least one image region.

In some embodiments, the execution entity of the image object detection method (for example, the server shown in FIG. 1) may perform region segmentation on the target image to obtain at least one image region. The above-mentioned region segmentation can be performed in multiple ways. As an example, region segmentation can be performed through a region proposal network.

Step 202: Perform feature extraction on each image region in the at least one image region to obtain at least one feature map.

In some embodiments, based on the at least one image region obtained in step 201, the above-mentioned execution entity (for example, the server shown in FIG. 1) may perform feature extraction on each image region in the at least one image region to obtain at least one feature map. Here, the above-mentioned feature maps usually include the color feature, texture feature, shape feature and spatial relationship feature of the image.

Here, the above-mentioned feature extraction can be performed in multiple ways. As an example, feature extraction can be performed by the Histogram of Oriented Gradient (HOG) method.

Step 203: Generate a semantic relation graph and a spatial distribution relation graph based on at least one feature map and at least one image region.

In some embodiments, the above execution entity may generate a semantic relation graph and a spatial distribution relation graph based on at least one feature map and at least one image region. As an example, the above-mentioned execution entity may use the at least one image region as a point set, and the spatial distribution relation between each image region and the remaining image regions as edges, and connect the edges and points to obtain a spatial distribution relation graph. As an example, the execution entity may use the at least one image region as a point set, and the semantic relation between each image region and the remaining image regions as edges, and connect the edges and points to obtain a semantic relation graph. Here, the semantic relation of the above image regions usually refers to the similarity of the content in two image regions. As an example, it can be determined by means of feature extraction and determining the similarity of the extracted features. Here, the above spatial distribution relation generally refers to the mutual spatial position or relative direction relation etc. between multiple image regions divided from the image.

In some optional modes of implementation of the embodiments, the above execution entity may determine the degree of semantic association between each image region and the remaining image regions in the above-mentioned at least one image region according to the following formula: $s'_{ij} = \delta(i,j) \cdot f(p_i^o, p_j^o) = \delta(i,j) \cdot \Phi(p_i^o) \Phi(p_j^o)^T$, wherein, $s'_{ij}$ represents the degree of semantic association between the $i^{th}$ image region and the $j^{th}$ image region; i indicates the $i^{th}$ image region, j indicates the $j^{th}$ image region, T represents the transposition of the matrix, $p_i^o$ represents the feature map of the $i^{th}$ image region, $p_j^o$ represents the feature map of the $j^{th}$ image region, δ represents the indicator function, Φ represents the mapping from the feature map of the image region to the latent space representation, and f represents the semantic association calculation function. Specifically, the above-mentioned semantic association calculation function is usually used to characterize the correspondence between two image regions and the degree of semantic association. As an example, the above-mentioned semantic association calculation function may be a shallow convolutional neural network with a fully connected layer. The input of the above-mentioned shallow convolutional neural network is the features of two image regions, and after several layers of convolutional calculations, the fully connected layer outputs the degree of semantic association.

Based on the above degree of semantic association, a semantic relation graph is generated. As an example, the above execution entity may use the image region as a point and the semantic association degree as an edge to generate an undirected graph, and use the generated undirected graph as a semantic relation graph. Here, the above-mentioned latent space usually refers to the space, also called the feature space, in which a feature vector is located, the feature vector being obtained after the image region undergoes a multilayer perceptron (MLP) operation.

In the optional modes of implementation of some embodiments, the above execution entity may determine the degree of spatial association between each image region and the remaining image regions in the above-mentioned at least one image region according to the following formula: $s''_{ij} = \mathcal{G}(C_i^o, C_j^o) = m_{ij}^r \cdot w_{ij}^r$, wherein, $s''_{ij}$ represents the degree of spatial association between the $i^{th}$ image region and the $j^{th}$ image region, $\mathcal{G}$ represents the function used to calculate the association relation on the spatial distribution. Specifically, the above-mentioned spatial association calculation function is usually used to characterize the correspondence between two image regions and the association relation on the spatial distribution. As an example, the function of the above-mentioned association relation on the spatial distribution may be a shallow convolutional neural network with a fully connected layer. The input of the above-mentioned shallow convolutional neural network is the feature of two image regions, and after several layers of convolutional calculations, the fully connected layer outputs the association relation on the spatial distribution of two image regions.

$C_i^o = (x_i, y_i, w_i, h_i)$ represents the coordinates of the area frame of the $i^{th}$ image region, wherein, $x_i$ represents the abscissa of the central point of the area frame of the $i^{th}$ image region, $y_i$ represents the ordinate of the central point of the area frame of the $i^{th}$ image region, $w_i$ represents the width of the area frame of the $i^{th}$ image region, $h_i$ represents the height of the area frame of the $i^{th}$ image region. $C_j^o = (x_j, y_j, w_j, h_j)$ represents the coordinates of the area frame of the $j^{th}$ image region, wherein, $x_j$ represents the abscissa of the center point of the area frame of the $j^{th}$ image region, $y_j$ represents the ordinate of the center point of the area frame of the $j^{th}$ image region, $w_j$ represents the width of the area frame of the $j^{th}$ image region, $h_j$ represents the height of the area frame of the $j^{th}$ image region. $m_{ij}^r$ represents the weight of the spatial similarity between the $i^{th}$ image region and the $j^{th}$ image region, and is determined by the following formula:

$$m_{ij}^r = \frac{\min(w_i, w_j) \cdot \min(h_i, h_j)}{w_i h_i + w_j h_j - \min(w_i, w_j) \cdot \min(h_i, h_j)}.$$

$w_{ij}^r$ represents the weight of the spatial distance between the $i^{th}$ image region and the $j^{th}$ image region, and is determined by the following formula: $w_{ij}^r = \exp(-\lambda \cdot m_{ij}^d)$, wherein, $m_{ij}^d$ represents the spatial distance between the centers of the $i^{th}$ image region and the $j^{th}$ image region; exp represents an exponential function with e as the base; and λ represents a scale parameter. A spatial distribution relation graph is generated based on the above degree of spatial association. As an example, the above execution entity may use the image region as a point and the degree of spatial association as an edge to generate an undirected graph, and use the generated undirected graph as a spatial distribution relation graph.

Step 204: Generate an image region relation graph based on the semantic relation graph and the spatial distribution relation graph.

In some embodiments, the above execution entity may generate an image region relation graph based on the semantic relation graph and the spatial distribution relation graph. As an example, in response to the semantic relation graph and the spatial distribution relation graph being undirected graphs, and the point sets in the semantic relation graph and the spatial distribution relation graph are the same, the edge sets of the two graphs are aggregated to obtain the image region relation graph.

Step 205: Determine a target image region from at least one image region based on the image region relation graph.

In some embodiments, the above execution entity may determine a target image region from at least one image region based on the image region relation graph. As an example, in response to the above image region relation graph being an undirected graph, the above execution entity may select from the image region relation graph, the image region with the most edges connected to the remaining image regions, as the target image region.

In the optional modes of implementation of some embodiments, the above execution entity may use a Graph Convolutional Network (GCN) and the following formula to determine the feature matrix of the above image region relation graph: $\mathcal{H}^{(l)} = \sigma(\mathcal{D}^{-1/2} \tilde{\varepsilon} \mathcal{D}^{-1/2} \mathcal{H}^{(l-1)} \mathcal{W}^l)$, wherein, $\mathcal{H}^{(l)}$ represents the feature matrix of the $l^{th}$ layer of the graph convolutional network, $\mathcal{D}$ represents the degree matrix of the image region relation graph, $\tilde{\varepsilon}$ represents the Laplacian matrix of the image region relation graph, $\mathcal{W}^l$ represents the weight matrix of the $l^{th}$ layer, σ represents the hyperbolic tangent activation function, and l represents the $l^{th}$ layer of the graph convolutional network. The fusion feature map of each image region is determined based on the above feature matrix and the following formula: $\tilde{P}=P \oplus \mathcal{H}^L$, wherein $\tilde{P}$ represents the fusion feature map of the image region, P represents the feature map of the image region, and ⊕ means addition element by element. The target image region is determined from the above at least one image region based on the above fusion feature map. As an example, the above execution entity can use the classification network and regression network to classify the category of the target area and regress the bounding box coordinates, to obtain the final object detection box and the corresponding semantic category. Specifically, the aforementioned degree matrix $\mathcal{D}$ usually indicates the number of edges representing node connections on the diagonal. The above classification network may be Convolutional Neural Networks (CNN). The above regression network may be Convolutional Neural Networks (CNN).

Step 206: Display the target image region.

In some embodiments, the above execution entity may display the target image region.

One of the above embodiments of this disclosure has the following beneficial effects: perform region segmentation on a target image to perform feature extraction on each image region; then generate a semantic relation graph and a spatial distribution relation graph based on the extracted features; generate an image region relation graph based on the semantic relation graph and the spatial distribution relation graph, and then determine a target image region from the image according to the image region relation graph; and finally, display the target image region, thereby accurately determine the target image region in the image and display it, which is more attractive to users to click, thus achieving the improvement of user experience and the growth of network traffic.

Figure 3:
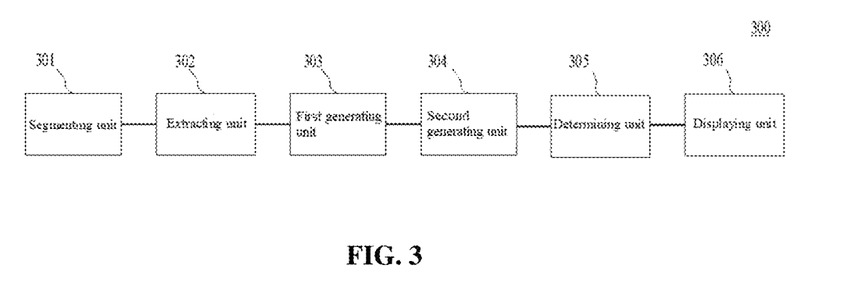
FIG. 3 is a schematic structural diagram of some embodiments of the image object detection device according to this disclosure.

With further reference to FIG. 3, as an implementation of the methods shown in the above figures, this disclosure provides some embodiments of an image object detection device. These embodiments of device correspond to those method embodiments shown in FIG. 2. The device can be specifically applied to various electronic equipment.

As shown in FIG. 3, the image object detection device 300 of some embodiments includes: a segmenting unit 301, an extracting unit 302, a first generating unit 303, a second generating unit 304, a determining unit 305, and a displaying unit 306. Wherein, the segmenting unit 301 is configured to perform region segmentation on a target image to obtain at least one image region; the extracting unit 302 is configured to perform feature extraction on each image region in the above at least one image region to obtain at least one feature map; the first generating unit 303 is configured to generate a semantic relation graph and a spatial distribution relation graph based on the above at least one feature map and the above at least one image region; the second generating unit 304 is configured to generate an image region relation graph based on the above semantic relation graph and spatial distribution relation graph; the determining unit 305 is configured to determine a target image region from the at least one image region based on the above image region relation graph; while the displaying unit 306 is configured to display the above target image region.

In the optional modes of implementation of some embodiments, the above first generating unit 303 is further configured to determine the semantic association between each image region and the remaining image regions in the above at least one image region according to the following formula: $s'_{ij}=\delta(i,j) \cdot f(p_i^o, p_j^o)=\delta(i,j) \cdot \Phi(p_i^o)\Phi(p_j^o)^T$, wherein, $s'_{ij}$ represents the degree of semantic association between the $i^{th}$ image region and the $j^{th}$ image region; i indicates the $i^{th}$ image region, j indicates the $j^{th}$ image region, T represents the transposition of the matrix, $p_i^o$ represents the feature map of the $i^{th}$ image region, $p_j^o$ represents the feature map of the $j^{th}$ image region, δ represents the indicator function, Φ represents the mapping from the feature map of the image region to the latent space representation, and f represents the semantic association calculation function. A semantic relation graph is generated based on the above semantic association degree.

In the optional modes of implementation of some embodiments, the above first generating unit 303 is further configured to determine the degree of spatial association between each image region and the remaining image regions in the above at least one image region according to the following formula: $s''_{ij}=\mathcal{G}(C_i^o, C_j^o)=m_{ij}^r \cdot w_{ij}^r$, wherein, $s''_{ij}$ represents the degree of spatial association between the $i^{th}$ image region and the $j^{th}$ image region, $\mathcal{G}$ represents the function used to calculate the association relation on the spatial distribution; $C_i^o (x_i, y_i, w_i, h_i)$ represents the coordinates of the area frame of the $i^{th}$ image region, wherein, $x_i$ represents the abscissa of the central point of the area frame of the $i^{th}$ image region, $y_i$ represents the ordinate of the central point of the area frame of the $i^{th}$ image region, $w_i$ represents the width of the area frame of the $i^{th}$ image region, $h_i$ represents the height of the area frame of the $i^{th}$ image region; $C_j^o=(x_j, y_j, w_j, h_j)$ represents the coordinates of the area frame of the $j^{th}$ image region, wherein, $x_j$ represents the abscissa of the center point of the area frame of the $j^{th}$ image region, $y_j$ represents the ordinate of the center point of the area frame of the $j^{th}$ image region, $w_j$ represents the width of the area frame of the $j^{th}$ image region, $h_j$ represents the height of the area frame of the $j^{th}$ image region; $m_{ij}^r$ represents the weight of the spatial similarity between the $i^{th}$ image region and the $j^{th}$ image region, and is determined by the following formula:

$$m_{ij}^r = \frac{\min(w_i, w_j) \cdot \min(h_i, h_j)}{w_i h_i + w_j h_j - \min(w_i, w_j) \cdot \min(h_i, h_j)};$$

$w_{ij}^r$ represents the weight of the spatial distance between the $i^{th}$ image region and the $j^{th}$ image region, and is determined by the following formula: $w_{ij}^r=\exp(-\lambda \cdot m_{ij}^d)$, wherein, $m_{ij}^d$ represents the spatial distance between the centers of the $i^{th}$ image region and the $j^{th}$ image region; exp represents an exponential function with e as the base; and λ represents a scale parameter. A spatial distribution relation graph is generated based on the above degree of spatial association.

In the optional modes of implementation of some embodiments, the above determining unit 305 is further configured to determine the feature matrix of the above image region relation graph using the graph convolutional network and the following formula: $\mathcal{H}^{(l)}=\sigma(\mathcal{D}^{-1/2} \tilde{\varepsilon} \mathcal{D}^{-1/2} \mathcal{H}^{(l-1)} \mathcal{W}^l)$, wherein, $\mathcal{H}^{(l)}$ represents the feature matrix of the $l^{th}$ layer of the graph convolutional network, $\mathcal{D}$ represents the degree matrix of the image region relation graph, $\tilde{e}$ represents the Laplacian matrix of the image region relation graph, $w^l$ represents the weight matrix of the $l^{th}$ layer, σ represents the hyperbolic tangent activation function, l represents the $l^{th}$ layer of the graph convolutional network. The fusion feature map of each image region is determined according to the above feature matrix and the following formula: $\tilde{P}=P \oplus \mathcal{H}^L$, wherein $\tilde{P}$ represents the fusion feature map of the image region, P represents the feature map of the image region, and ⊕ means addition element by element. The target image region is determined from the above at least one image region according to the above fusion feature map.

It can be understood that the units recorded in the device 300 correspond to the individual steps in the method described with reference to FIG. 2. Therefore, the operations, features, and the resultant beneficial effects described above for the method are also applicable to the device 300 and the units contained therein, and will not be repeated here.

One of the above embodiments of this disclosure has the following beneficial effects: perform region segmentation on a target image to perform feature extraction on each image region; then generate a semantic relation graph and a spatial distribution relation graph based on the extracted features; generate an image region relation graph based on the semantic relation graph and the spatial distribution relation graph, and determine a target image region from the image according to the image region relation graph; and finally, display the target image region, thereby accurately determine the target image region in the image and display it, which is more attractive to users to click, thus achieving the improvement of user experience and the growth of network traffic.

Figure 4:
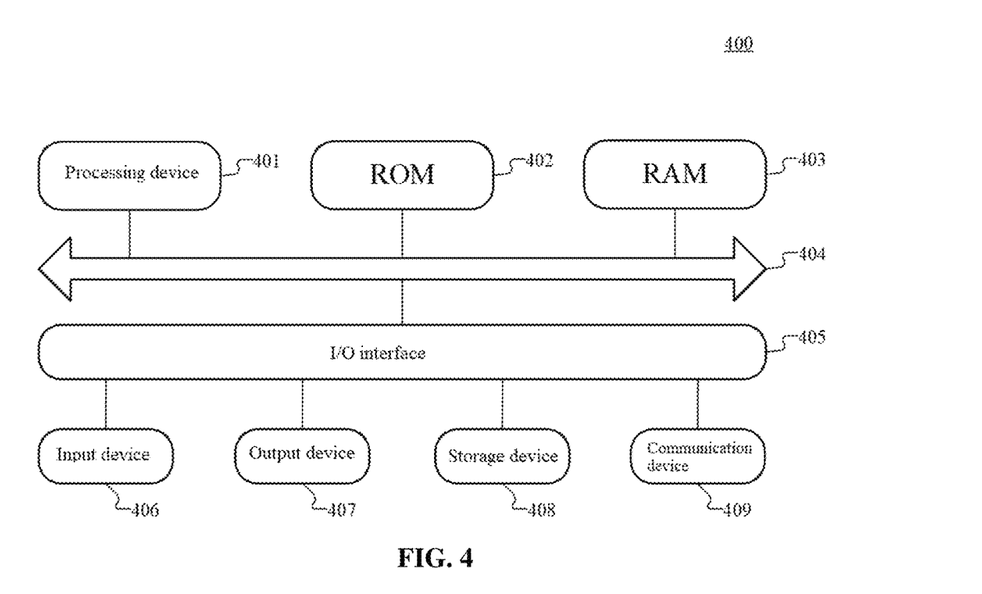
FIG. 4 is a schematic structural diagram of the electronic equipment suitable for implementing some embodiments of this disclosure.

Referring now to FIG. 4, it shows a schematic structural diagram of the electronic equipment (for example, the server in FIG. 1) 400 suitable for implementing some embodiments of this disclosure. The electronic equipment shown in FIG. 4 is only an example, and shall not bring any limitations to the function and scope of use of the embodiments of this disclosure.

As shown in FIG. 4, the electronic equipment 400 may include a processing device (such as a central processing unit, a graphics processor, etc.) 401, which can execute various appropriate actions and processes according to the program stored in the read only memory (ROM) 402 or the program loaded from the storage device 408 to the random access memory (RAM) 403. In the RAM 403, various programs and data required for the operation of the electronic equipment 400 are also stored. The processing device 401, the ROM 402, and the RAM 403 are connected to each other through a bus 404. An input/output (I/O) interface 405 is also connected to the bus 404.

Generally, the following devices can be connected to the I/O interface 405: input devices 406 including e.g. touch screen, touch pad, keyboard, mouse, camera, microphone, accelerometer, gyroscope, etc.; output devices 407 including e.g. liquid crystal display (LCD), speakers, vibration, etc.; storage devices 408 including e.g. magnetic tape, hard disk, etc.; and a communication device 409. The communication device 409 may allow the electronic equipment 400 to perform wireless or wired communication with other devices to exchange data. Although FIG. 4 shows the electronic equipment 400 having various devices, it should be understood that it is not required to implement or have all the devices shown. It may alternatively implement or have more or fewer devices. Each block shown in FIG. 4 can represent one device, or can represent multiple devices as needed.

In particular, according to some embodiments of this disclosure, the process described above with reference to the flowchart may be implemented as a computer software program. For example, some embodiments of this disclosure include a computer program product, which includes a computer program carried on a computer-readable medium, the computer program containing program codes for carrying out the method shown in the flowchart. In some such embodiments, the computer program may be downloaded and installed from the network through the communication device 409, or installed from the storage device 408, or installed from the ROM 402. When the computer program is executed by the processing device 401, the above-mentioned functions defined in the methods of some embodiments of this disclosure are executed.

It should be noted that the above-mentioned computer-readable medium in some embodiments of this disclosure may be a computer-readable signal medium or a computer-readable storage medium, or any combination of the above two. The computer-readable storage medium may be, for example, but not limited to, an electrical, magnetic, optical, electromagnetic, infrared, or semiconductor system, device, or component, or any combination of the above. More specific examples of the computer-readable storage medium may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In some embodiments of this disclosure, the computer-readable storage medium may be any tangible medium that contains or stores a program, which program may be used by or in combination with an instruction execution system, device, or component. In some embodiments of this disclosure, the computer-readable signal medium may include a data signal propagated in baseband or as a part of a carrier wave, in which computer-readable program codes are carried. This propagated data signal can take many forms, including but not limited to electromagnetic signal, optical signal, or any suitable combination thereof. The computer-readable signal medium may also be any computer-readable medium other than the computer-readable storage medium. The computer-readable signal medium may send, propagate, or transmit the program for use by or in combination with the instruction execution system, device, or component. The program code contained on the computer-readable medium can be transmitted by any suitable medium, including but not limited to: wire, optical cable, RF (radio frequency), etc., or any suitable combination of the above.

In some embodiments, the client and server can communicate with any currently known or future developed network protocol such as HTTP (HyperText Transfer Protocol), and can interconnect with any form or medium of digital data communication (for example, communication network). Examples of communication networks include local area networks ("LAN"), wide area networks ("WAN"), internets (for example, the Internet), and end-to-end networks (for example, ad hoc end-to-end networks), as well as any currently known or future developed networks.

The above computer-readable medium may be included in the electronic equipment; or it may exist alone without being assembled into the electronic equipment. The above computer-readable medium carries one or more programs, and when the one or more programs are executed by the electronic equipment, the electronic equipment is made to carry out the method of the foregoing embodiment.

The computer program code used to perform the operations of some embodiments of this disclosure may be written in one or more programming languages or a combination thereof. The above programming languages include object-oriented programming languages, and also include conventional procedural programming languages. The program code can be executed entirely on the user's computer, executed partly on the user's computer, executed as an independent software package, executed partly on the user's computer and partly on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to connect via the Internet).

The flowcharts and block diagrams in the accompanying drawings illustrate the architectures, functions and operations that could possibly be implemented by the system, method and computer program product of the various embodiments of this disclosure. In this regard, each block in the flowchart or block diagram can represent a module, program segment, or part of code, which contains one or more executable instructions for implementing the specified logic functions. It should also be noted that, in some alternative implementations, the functions marked in the block may also occur in a different order from that marked in the drawings. For example, two blocks shown in succession can actually be executed substantially in parallel, or they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or it can be implemented by a combination of the dedicated hardware and computer instructions.

The functions described above herein may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical Device (CPLD) and so on.

The above description is only some preferred embodiments of this disclosure and an explanation of the applied technical principles. Those skilled in the art should understand that the scope of the invention involved in the embodiments of this disclosure is not limited to the technical solution formed by the specific combination of the above technical features, and at the same time it should also cover the other technical solutions formed by any combination of the above technical features or equivalent features thereof without departing from the above-mentioned inventive concept. For example, the technical solution is formed by mutual substitution between the above features and the technical features having similar functions and disclosed in (but not limited to) the embodiments of this disclosure.

What is claimed is:

1. An image object detection method, including:
performing region segmentation on a target image to obtain at least one image region;
performing feature extraction on each image region in the at least one image region to obtain at least one feature map;
generating a semantic relation graph and a spatial distribution relation graph based on the at least one feature map and the at least one image region;
generating an image region relation graph based on the semantic relation graph and spatial distribution relation graph;
determining a target image region from the at least one image region based on the image region relation graph;
displaying the target image region,
wherein generating the semantic relation graph and the spatial distribution relation graph based on the at least one feature map and the at least one image region, comprises:
determining a degree of spatial association between each image region and remaining image regions in the at least one image region according to following formula:

$$s''_{ij} = \mathcal{G}(C_i^o, C_j^o) = m_{ij}^r \cdot w_{ij}^r,$$

wherein, $s''_{ij}$ represents the degree of spatial association between a $i^{th}$ image region and a $j^{th}$ image region;
$\mathcal{G}$ represents a function used to calculate an association relation on spatial distribution;
$C_i^o = (x_i, y_i, w_i, h_i)$ represents coordinates of an area frame of the $i^{th}$ image region, wherein, $x_i$ represents an abscissa of central point of the area frame of the $i^{th}$ image region, $y_i$ represents an ordinate of the central point of the area frame of the $i^{th}$ image region, $w_i$ represents a width of the area frame of the $i^{th}$ image region, $h_i$ represents a height of the area frame of the $i^{th}$ image region;
$C_j^o = (x_j, y_j, w_j, h_j)$ represents coordinates of an area frame of the $j^{th}$ image region, wherein, $x_j$ represents an abscissa of a center point of the area frame of the $j^{th}$ image region, $y_j$ represents an ordinate of the center point of the area frame of the $j^{th}$ image region, $w_j$ represents a width of the area frame of the $j^{th}$ image region, $h_j$ represents a height of the area frame of the $j^{th}$ image region;
$m_{ij}^r$ represents a weight of spatial similarity between the $i^{th}$ image region and the $j^{th}$ image region, and is determined by following formula:

$$m_{ij}^r = \frac{\min(w_i, w_j) \cdot \min(h_i, h_j)}{w_i h_i + w_j h_j - \min(w_i, w_j) \cdot \min(h_i, h_j)};$$

$w_{ij}^r$ represents a weight of a spatial distance between the $i^{th}$ image region and the $j^{th}$ image region, and is determined by following formula:

$$w_{ij}^r = \exp(-\lambda \cdot m_{ij}^d),$$

wherein, $m_{ij}^d$ represents the spatial distance between centers of the $i^{th}$ image region and the $j^{th}$ image region;
exp represents an exponential function with e as a base;
$\lambda$ represents a scale parameter, and
generating the spatial distribution relation graph based on the degree of spatial association.

2. The method according to claim 1, wherein, generating a semantic relation graph and a spatial distribution relation graph based on the at least one feature map and the at least one image region, comprises:
determining a degree of semantic association between each image region and remaining image regions in the at least one image region according to following formula:

$$s'_{ij} = \delta(i,j) \cdot f(p_i^o, p_j^o) = \delta(i,j) \cdot \Phi(p_i^o) \Phi(p_j^o)^T,$$

wherein, $s'_{ij}$ represents the degree of semantic association between a $i^{th}$ image region and a $j^{th}$ image region;
i indicates the $i^{th}$ image region;
j indicates the $j^{th}$ image region;
T represents transposition of matrix;
$p_i^o$ represents a feature map of the $i^{th}$ image region;
$p_j^o$ represents a feature map of the $j^{th}$ image region;

δ represents an indicator function;

Φ represents a mapping from feature map of image region to a latent space representation;

f represents a semantic association calculation function;

generating a semantic relation graph based on the degree of semantic association.

3. The method of claim 1, wherein, determining a target image region from the at least one image region based on the image region relation graph, comprises:

using a graph convolutional network and following formula to determine a feature matrix of the image region relation graph: $\mathcal{H}^{(l)} = \sigma(\mathcal{D}^{-1/2} \tilde{\varepsilon} \mathcal{D}^{-1/2} \mathcal{H}^{(l-1)} \mathcal{W}^l)$, wherein, $\mathcal{H}^{(l)}$ represents a feature matrix of a $l^{th}$ layer of the graph convolutional network;

$\mathcal{D}$ represents a degree matrix of the image region relation graph;

$\tilde{\varepsilon}$ represents a Laplacian matrix of the image region relation graph;

$\mathcal{W}^l$ represents a weight matrix of the $l^{th}$ layer;

σ represents a hyperbolic tangent activation function;

l represents a $l^{th}$ layer of the graph convolutional network;

a fusion feature map of each image region is determined from the feature matrix and following formula:

$\tilde{P} = P \oplus \mathcal{H}^L$, wherein, $\tilde{P}$ represents a fusion feature map of the image region;

P represents a feature map of the image region;

⊕ means addition element by element;

determining a target image region from the at least one image region based on the fusion feature map.

4. An image object detection device, comprising:

a partitioner, configured to perform region segmentation on a target image to obtain at least one image region;

an extractor, configured to perform feature extraction on each image region in the at least one image region to obtain at least one feature map;

a first generator, configured to generate a semantic relation graph and a spatial distribution relation graph based on the at least one feature map and the at least one image region;

a second generator, configured to generate an image region relation graph based on the semantic relation graph and spatial distribution relation graph;

a determiner, configured to determine a target image region from the at least one image region based on the image region relation graph;

a display, configured to display the target image region, wherein the first generator is further configured to determine a degree of spatial association between each image region and remaining image regions in the at least one image region according to following formula:

$s''_{ij} = \mathcal{F}(C_i^o, C_j^o) = m_{ij}^r \cdot w_{ij}^r$, wherein, $s''_{ij}$ represents the degree of spatial association between a $i^{th}$ image region and a $j^{th}$ image region;

$\mathcal{F}$ represents a function used to calculate an association relation on spatial distribution;

$C_i^o = (x_i, y_i, w_i, h_i)$ represents coordinates of an area frame of the $i^{th}$ image region, wherein, $x_i$ represents an abscissa of central point of the area frame of the $i^{th}$ image region, $y_i$ represents an ordinate of the central point of the area frame of the $i^{th}$ image region, $w_i$ represents a width of the area frame of the $i^{th}$ image region, $h_i$ represents a height of the area frame of the $i^{th}$ image region;

$C_j^o = (x_j, y_j, w_j, h_j)$ represents coordinates of an area frame of the $j^{th}$ image region, wherein, $x_j$ represents an abscissa of a center point of the area frame of the $j^{th}$ image region, $y_j$ represents an ordinate of the center point of the area frame of the $j^{th}$ image region, $w_j$ represents a width of the area frame of the $j^{th}$ image region, $h_j$ represents a height of the area frame of the $j^{th}$ image region;

$m_{ij}^r$ represents a weight of spatial similarity between the $i^{th}$ image region and the $j^{th}$ image region, and is determined by following formula:

$$m_{ij}^r = \frac{\min(w_i, w_j) \cdot \min(h_i, h_j)}{w_i h_i + w_j h_j - \min(w_i, w_j) \cdot \min(h_i, h_j)};$$

$w_{ij}^r$ represents a weight of a spatial distance between the $i^{th}$ image region and the $j^{th}$ image region, and is determined by following formula:

$w = \exp(-\lambda \cdot m_{ij}^d)$, wherein, $m_{ij}^d$ represents the spatial distance between centers of the $i^{th}$ image region and the $j^{th}$ image region;

exp represents an exponential function with e as a base;

λ represents a scale parameter, and generate the spatial distribution relation graph based on the degree of spatial association.

5. An electronic equipment, including:

one or more processors;

a storage device, on which one or more programs are stored;

when one or more programs are executed by one or more processors, the one or more processors are made to implement the method stated in any of claims 1-2 and 3.

6. A computer-readable medium with a computer program stored thereon, wherein, when the program is executed by a processor, the method described in any of claims 1-2 and 3 is implemented.

* * * * *